G. W. CAMPBELL.

CASTING BULLETS, &c.

No. Reissue 222 Reissued Aug. 3, 1852

THE MORRIS PETERS CO., PHOTO-LITHO., WASHINGTON, D. C.

UNITED STATES PATENT OFFICE.

GEORGE W. CAMPBELL, OF NEW YORK, N. Y.

IMPROVEMENT IN THE MANUFACTURE OF BULLETS, &c.

Specification forming part of Letters Patent No. 5,371, dated November 20, 1847; Reissue No. 212, dated August 3, 1852.

*To all whom it may concern:*

Be it known that I, GEORGE W. CAMPBELL, of the city, county, and State of New York, have invented certain new and useful Improvements in the Machine for Casting Bullets and other Articles of Lead or other Metal; and I do hereby declare that the following is a full, clear, and exact description thereof, reference being had to the accompanying drawings, making part of this specification, in which—

Figure 2:
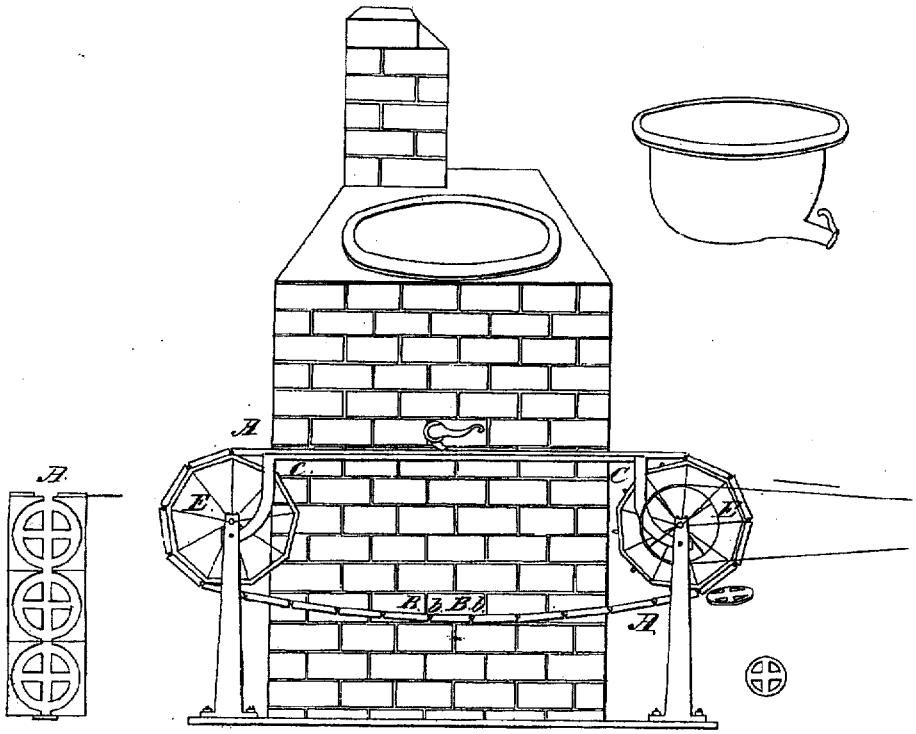
Figure 1:
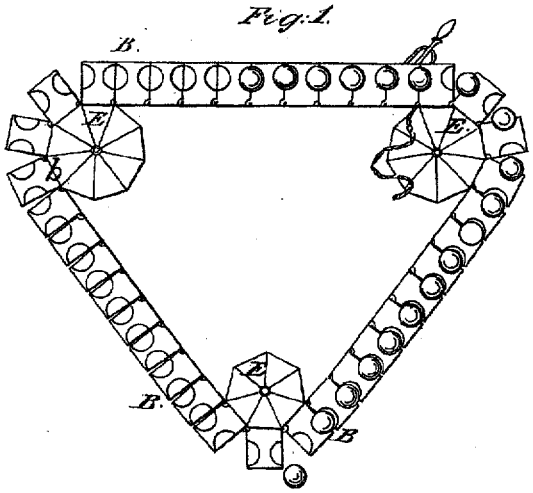

Figure 1 is a longitudinal vertical section of my improvement as applied to the casting of bullets; Fig. 2, a side elevation of the same applied to the casting of buckles, and mounted in connection with a furnace and kettle for melting the lead, the kettle being represented in a separate figure, as also a face view on an enlarged scale of a portion of the chain of molds for casting buckles.

My invention, although applicable to the casting of various articles, is specially intended for casting bullets, and what are called "buckles" by the manufacturers of white lead—that is, pieces of lead cast in a peculiar form to present a large amount of surface to the chemical action to which they are subjected in converting lead into what is called in the shops "white lead."

The object of my invention is so to connect a series of molds having a continuous motion to pass in succession under a suitable spout to receive the molten lead and return to be recharged, that the separation of the several articles from each other, or their discharge, shall be practically effected.

In casting buckles, the molds are formed with sufficient draw, as it is called, to permit the buckle to drop out when the mold is tipped over; but when cast in a succession of molds from a constant stream of lead some of the buckles are united by a filament of lead, which must be broken to permit the discharge, and in casting bullets and other like articles each mold must be made to open for the discharge.

The nature of my invention consists in so jointing together a series of molds or parts of molds that they shall separate and come together in a plane vertical, or nearly so, and at right angles, or nearly so, to the line of motion of the series, and thereby afford an easy and effectual method of discharging the contents or of breaking the filament of lead, which, by reason of the continuous motion of the series of molds and the continuous stream of lead, forms a connection between the several molds.

The accompanying drawings represent the modes of construction which I have essayed with success.

For casting bullets the series of molds are formed into an endless chain, B, composed of cubical blocks hinged together by their inner edges, *b*, as seen in Figure 1. The faces of these blocks that come together are cut out with a semispherical cavity, so that when the chain is in a straight line there will be one mold formed at each junction of two blocks, with a sprue-hole passing out through the surface. The chain thus constructed passes around three polygonal rollers, E, two of which are on the same level and the third below and midway between them. As the chain of molds moves along under a spout from a kettle, the molten lead runs into and fills the molds, and as the chain passes around the first roller the several blocks are separated at their outer edges, which loosens the castings in the molds and breaks in part any filaments of lead which may extend from the one to the other; and, finally, when the chain passes around the lower roller, the blocks are sufficiently separated to permit the bullets to drop out. The chain then continues to move until the molds close up and again pass under the spout to receive another charge of lead.

When applied to the casting of "buckles," as they are termed, the blocks forming the chain A, Fig 2, are flat and hinged together in the same manner, and in the face of each block is cut out the reverse of a buckle. This chain passes around two polygonal rollers placed on the same level, the faces of the polygons corresponding with the links of the chain of molds. Between the two rollers there is a table, *c c*, on which the inner or under surface of the chain slides in moving under the spout which delivers the lead. The outer or upper surface of the mold may be cut out from one to the other to form a continuous trough for the lead, to prevent it from spreading and running over the surface of the chain. As the chain moves on from under the spout which supplies the molten lead and passes around one of the rollers, the molds are separated, which breaks any filaments of lead extending from one mold to the next of the series, and then, by gravity, the buckles drop out of the molds, or are forced out by the blow of a light trip-hammer. In this way, it will be seen, the series of molds can continue to pass under the spout and to discharge the articles thus molded and return under the spout, thus rendering the operations of molding and discharging continuous.

I am aware that many years ago the attempt was made to cast bullets by a succession of molds passing under a kettle, but in that case the molds were formed in the faces of two or more disks or rings, one or two of them being made in segments coming together in planes parallel to the line of motion, and the face of each segment constituting part of several molds. With such a construction it will be obvious that the simple opening of the segment or segments of the molds would not liberate the bullets, nor would it effect the separation of the connecting filament, and, therefore, it did not effect the purpose contemplated by me. I do not, therefore, claim as of my invention casting bullets, buckles, and other articles in a series of molds moving under a spout, when the surface on which the lead is poured is unbroken; nor do I wish to limit myself to the precise construction of molds nor to the special arrangement of them so long as the same results are produced by equivalent means; but

What I claim as my invention, and desire to secure by Letters Patent, in the method of casting bullets, &c., in a succession of connected molds, is—

Jointing them together so that they shall separate and come together in vertical planes at right angles to the line of motion of the series, or nearly so, substantially as and for the purpose specified.

GEO. W. CAMPBELL.

Witnesses:

WM. H. BISHOP,

CAUSTEN BROWNE.